United States Patent [19]

Grumpelt et al.

[11] Patent Number: 4,541,345
[45] Date of Patent: Sep. 17, 1985

[54] APPARATUS FOR RECOVERING ENERGY FROM PYROLYZABLE, CARBONACEOUS WASTE MATERIALS OF VARYING COMPOSITION

[75] Inventors: Heinrich Grumpelt; Johannes Jaroch, both of Bad Bentheim, Fed. Rep. of Germany

[73] Assignee: C. Deilmann AG, Bad Bentheim, Fed. Rep. of Germany

[21] Appl. No.: 591,446

[22] Filed: Mar. 20, 1984

[30] Foreign Application Priority Data

Mar. 23, 1983 [DE] Fed. Rep. of Germany ....... 3310534

[51] Int. Cl.⁴ .............................................. F23D 1/00
[52] U.S. Cl. ..................................... 110/229; 48/61; 110/226; 110/230; 110/245; 110/246
[58] Field of Search ............... 110/229, 226, 245, 246, 110/230; 48/61, 66

[56] References Cited

U.S. PATENT DOCUMENTS

| | | | |
|---|---|---|---|
| 4,417,528 | 11/1983 | Vining et al. ........................ | 110/229 |
| 4,432,290 | 2/1984 | Ishii et al. ........................ | 110/229 X |
| 4,437,416 | 3/1984 | Ishii et al. ........................ | 110/229 X |

*Primary Examiner*—Edward G. Favors
*Attorney, Agent, or Firm*—Felfe & Lynch

[57] ABSTRACT

An apparatus for recovering energy from pyrolyzable, carbonaceous waste materials, for example household refuse, comprising a rotary tube reactor (4) adapted to be charged with the waste materials and producing, as products, a (low temperature) carbonization gas and a pyrolytic coke at a reaction temperature of above 200° C.; a fluidized bed or swirling layer gasifier adapted to be supplied with an oxygen-containing gasifying agent, the pyrolytic coke and, optionally, waste materials and from which exit a hot gas having a temperature of between 400° and 1000° C. and an inert ash. Further, the system includes cleaning stages (8, 20) for the carbonization gas, connected subsequent to the rotary tube reactor and the gasifier (14), and further a combustion device (24) for the cleaned gases, as a part of a boiler system.

10 Claims, 1 Drawing Figure

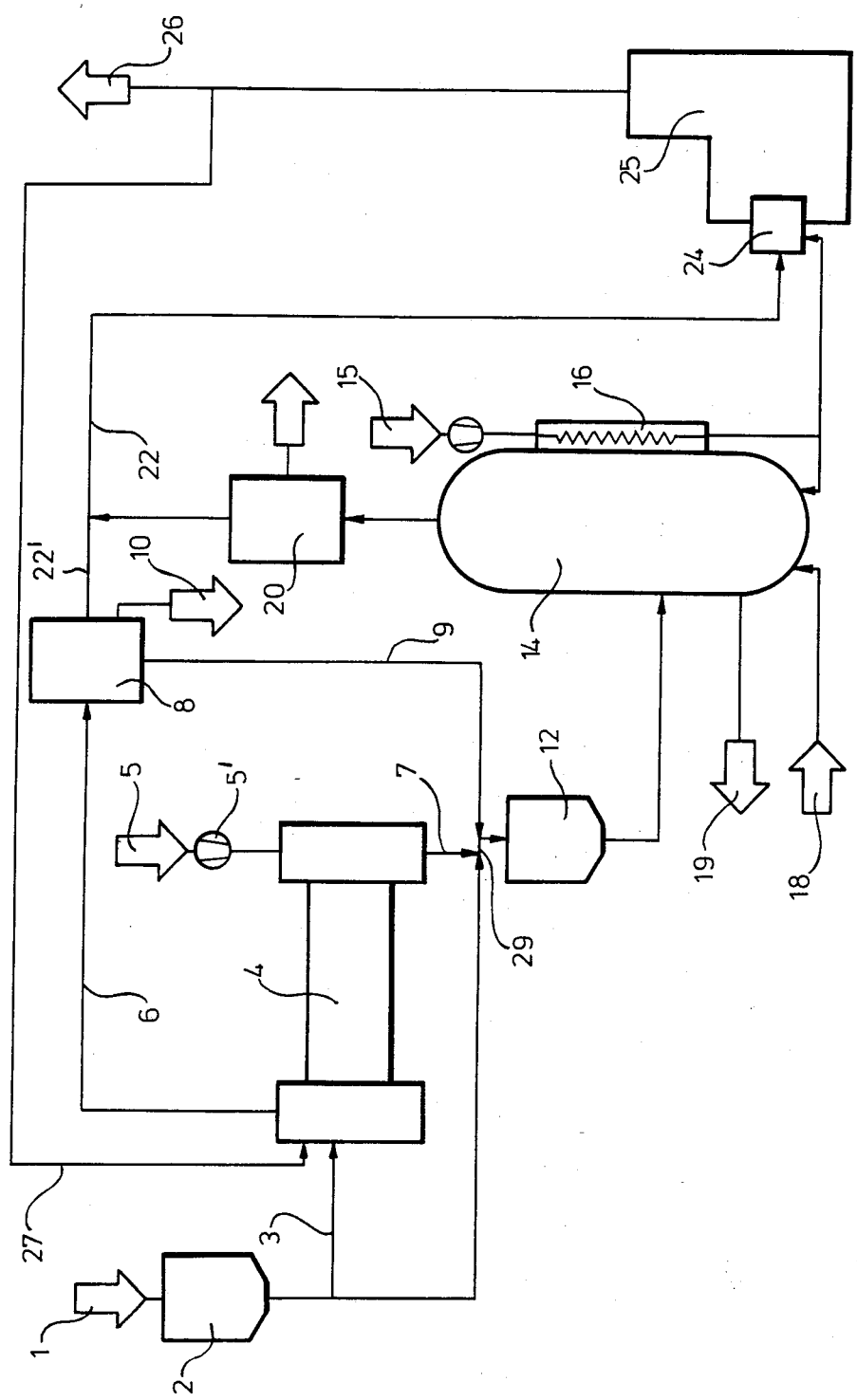

APPARATUS FOR RECOVERING ENERGY FROM PYROLYZABLE, CARBONACEOUS WASTE MATERIALS OF VARYING COMPOSITION

The present invention relates to an apparatus for recovering energy from pyrolyzable, carbonaceous waste materials of varying composition, comprising
   at least one rotary tube reactor adapted to be charged with the waste materials and producing as products, a low temperature carbonization gas and a pyrolytic coke at a reaction temperature of above 200° C.;
   a cleaning stage for the carbonization gas, said stage being connected subsequent to the rotary tube reactor;
   and a combustion device for the cleaned carbonization gas.

Pyrolizable waste materials, such as, for example, industrial or household refuse, are employed in continuous processes for the generation of pyrolytic gas. The apparatus for a system of this kind includes a heated rotary tube as the pyrolysis reactor. The material is transported by the combined action of rotation and inclination of the rotary tube. The recovered pyrolytic gas is not free from solid materials. Thus, a pyrolytic gas cleaning step must be performed subsequent to the reactor (compare periodical CAV, Chemische Apparate und Verfahren, 1981, p. 128).

In the conventional apparatus, it appeared inevitable that the reactor has connected subsequent thereto (downstream thereof) a pyrolytic gas purification or cleaning unit operating with cooling and recondensation of the gases to form pyrolytic oil. Normally, this pyrolytic gas had to be heated again in order that it could be burnt. Add to this that inhomogenous waste materials, i.e. even such materials of varying composition, e.g. the household refuse produced in large quantities, result in a quality and composition of the pyrolytic oil which can hardly be determined.

Accordingly, it is the object of the invention to provide an apparatus of the kind as outlined above, in which even the use of waste materials of varying composition and which, further may even be highly inhomogenous in nature, permits to recover energy without pyrolytic oil difficult to handle being produced in the apparatus.

In the above apparatus, this object is solved in accordance with the present invention in that in addition to the series-connected installation of a first branch (rotary tube reactor, carbonization gas purification stage), a second installation branch is connected to precede the combustion device, said second branch including a fluidized bed or swirling layer gasifier which has supplied thereto
   an oxygen-containing gasifying agent,
   the pyrolytic coke
   and, optionally, waste materials, and from which exit
   a hot gas having temperature of between 400° and 1000° to be used for combustion in the combustion device,
   and an inert ash
and that the second branch further includes a cleaning or purification stage for the hot gas from the fluidized bed or swirling layer gasifier.

In pyrolytic systems operating with a secondary medium, e.g. with a swirling layer of fluidized bed, the problem of contamination of the secondary medium by the various waste materials which are processed is well known. Purification or cleaning and reprocessing of the secondary medium is costly and requires much energy.

It is therefore another object of the invention to provide an apparatus in which the swirling layer or fluidized bed gasifier is adapted to operate even without a secondary medium. Such mode of operation is practicable if—as indicated above—pyrolytic coke from the rotary tube (or kiln) reactor is employed as the medium to be gasified.

Normally, the cleaning stages are operated without cooling or condensation; these stages are merely hot-gas dust separators from which the gas exits without separation of the relatively high-boiling components (e.g. phenols) resulting from the pyrolysis.

In corresponding manner and preferably, it is also contemplated that the gas conduits carrying the (low temperature) carbonization gas or hot gas are adapted to be heated such that the temperature of the gases may be kept above 200° C. A temperature of this order is generally sufficient to maintain the indicated higher-boiling components in the gaseous form. A further simplification is obtained when the gas conduits of the first and second branches are joined into a mixed (composite) gas conduit or pipeline.

Accordingly, the apparatus according to the invention may be operated in different modes of operation. Depending on the raw material (grain size, water contents, calorific value), it can be discriminated between the following categories:
1. Drying and degassing in the rotary tube reactor with subsequent gasification of the pyrolytic coke in the fluidized bed or swirling layer gasifier;
2. drying, degassing and gasifying in the rotary tube reactor only;
3. drying, degassing and gasifying in the fluidized bed or swirling layer gasifier only;
4. drying and degassing in the fluidized bed or swirling layer gasifier.

In special instances (for example, in the case of high water contents), a flue gas return conduit may be provided for returning the flue gas into the rotary tube where the gas is utilized to pre-dry and heat the raw materials.

The pyrolytic gas (carbonization gas) leaves the rotary tube reactor at temperature of above 200° C., generally from between 400° and 1000° C., and this gas is first freed from dust in a gas cleaning stage. The ash produced is withdrawn through gas-tight conveying systems. Upon sufficient dust removal, the carbonization gas is fed, in combination or admixture with a hot gas from the swirling layer gasifier, to a hot gas burner as described, for instance, in the abovementioned publication CAV on page 122 thereof. Depending on the mixing ratio and oxygen-containing gasifying medium, the combustion gas upstream of the burner has a gas calorific value of from 600 to 6000 kcal/Nm$^3$. The power to be yielded from a typical apparatus according to the invention is in the range of from 20 to 60,000 kW, based upon the separate installations. The complete system is controlled by controlled variables, such as oxygen contents, exhaust gas temperature, $CO/CO_2$ ratio, feeding or return temperature, which may be picked up from the boiler system by sensors. Also, the system may be operated in a fully automatic manner.

An embodiment of the apparatus according to the invention is shown in the drawing. The drawing illustrates in diagram form a functionable apparatus according to the invention.

A raw material bin 2 is charged through a customary waste material inlet 1 supplied via vehicles. As waste materials, the following materials may be used: Industrial refuse composed, for example, of loaded fuller's earth with wood, cardboard, paper, plastics materials and canteen refuse; household refuse (summer or winter refuse), old tires, bulk garbage from scrap metal utilization, and the like. The waste material to be used for the pyrolysis in a rotary tube is taken from the raw material bin 2 through a continuously controllable conveying system 3. The waste materials are fed into the rotary tube reactor through a gas-tight lock gate system. The material is transported or conveyed by rotation and inclination of the rotary tube. Air as gasifying medium is supplied to the rotary tube reactor 4 through air supply means 5 including a variable blower 5'. The rotary rube reactor may be heated separately; in many instances, such auxiliary heating is not required. The (low temperature) carbonization gas produced by partial combustion and pyrolysis has a temperature of, normally, between 400° and 500° C., but in any case above 200° C., and a calorific value of between 1000 and 3000 kcal/Nm$^3$. By a discharge or outlet conduit 6 emanating from the inlet of the rotary tube reactor and being thermally insulated, the carbonization gas is maintained at a temperature of above 200° C. and fed to a first gas cleaning or purification stage 8. The gas cleaning stage includes one or optionally several cyclone gas separators or equivalent gas cleaning assemblies, such as filters or the like, from which fine ash is withdrawn or discharged (ash outlet 10) or carbonaceous dusts are fed to a collecting point 29 through a feed pipe 9 which may optionally be provided with a cooling device.

The carbonization gas from which dust or coke has been removed, passes through a short conduit 22' to a hot-gas mixing conduit 22 being highly thermally insulated or even adapted to be heated, respectively, so as to ensure in any case that the hot gas cannot cool to below 200° C. during its passage to a combustion device 24/25.

The combustion device constitutes part of a boiler system or plant. It includes a hot-gas burner 24 which may be formed also as a combination burner for other fuels, and a subsequently positioned boiler 25. Additionally, natural gas or heavy oil burners may be installed, in order to provide for continuous operation of the boiler system under all circumstances. The exhaust gases of the boiler system are discharged through a flue gas outlet 26. Further, a flue gas return conduit 27 is provided between the flue gas outlet and the rotary tube reactor 4, which conduit may be used for further energy recuperation. The flue gases may be used for heating the interior of the rotary tube reactor.

Through a pyrolytic coke outlet 7 which may be used also as an ash (discharge) outlet, the resulting pyrolytic coke is then fed from the rotary tube reactor to the collecting point 29. This pyrolytic coke generally still contains a high proportion of latent energy which may be converted into a gas by further (low temperature) carbonization/gasification, and this gas may be burnt in the boiler system with the aid of the hot-gas burner 24. Further, another raw material supply 11 is connected to the collecting point 29. The conduits or pipelines leading to the collecting point 29 terminate within a metering bin 12 wherein the following products are collected: small-particle screened raw material from the raw material bin 2; optionally broken pyrolytic coke from the rotary tube reactor 4; and pyrolytic coke dust from the gas cleaning stage 8.

The mixture from the metering bin 12 is fed into a swirling layer (fluidized bed) gasifier 14 through a charging system being connected in gas-tight fashion to a swirling layer gasifier housing. Swirling layer gasifiers of this type are described in various embodiments in literature. A prototype of a swirling layer gasifier of this type, according to WINKLER, is described, for example, in the periodical article "Die kommerziell angewandten Verfahren der Kohlevergasung" (The commercially applied methods of coal gasification), author: H. Staege, in "Technische Mitteilungen Krupp, Werkberichte, 1980, page 28.

Owing to the admixture of the pyrolytic coke, the swirling layer reactor is capable of operating without the use of a secondary medium. It is only necessary that the swirling layer reactor is cleaned periodically. A gasifying agent is supplied to the swirling layer gasifier through a conduit 18. Also provided is an ash (discharge) outlet 19. The hot gas exiting from the gasifier 14 at a temperature of between 400° and 1000° C. has its dust removed by a second gas purification stage 20 which likewise operates preferably in accordance with the cyclone separation process, and the hot gas is passed to the hot-gas mixing conduit 22 in which it is mixed with the carbonization 1 gas from the rotary tube reactor. The gas mixture is supplied to the hot-gas burner 24.

The hot-gas burner 24 and/or swirling layer gasifier 14 may be fed with air preheated by a preheating heat exchanger 16. The air is injected by a blower 15 through this heat exchanger 16.

In the swirling layer gasifier 14, the material taken from the metering bin 12 is completely pyrolyzed or gasified with the addition of air, oxygen-enriched air or pure oxygen introduced with water or (water) steam (conduit 18).

The apparatus permits to employ even a highly inhomogeneous waste material without the provision of precedingly arranged crusher units of larger size. The coarse-particle material may be fed directly into the rotary tube reactor 4, whereas screened fine material is supplied to the swirling layer gasifier 14 in combination with the pyrolytic coke.

Depending on the requirements of the system, it is also possible to take into account such parameters which have an effect on the calorific value (e.g. proportion or contents of inert material or water).

Considered on the whole, there is thus provided an apparatus which is capable of processing even highly inhomogeneous materials and materials of varying composition.

At this point, it may also be noted that the term "combustion systems" may embrace also internal combustion engines, gas engines or gas turbines and similar structures.

Finally, it does not appear improbable that the recovered gases may be subjected to intermediate or further processing also in petrochemical plants, in order to at least partially recover their contents of organic substances.

We claim:

1. Apparatus for recovering energy from pyrolyzable, carbonaceous waste materials of varying composition, comprising:
   at least one rotary tube reactor having means to receive the waste materials and means for producing as products, a low temperature carbonization gas and a pyrolytic coke at a reaction temperature of above 200° C., said reactor further including means to discharge said carbonization gas and means to discharge said coke;

means to clean the carbonization gas, said means being connected subsequent to the rotary tube reactor; combustion means to combust the cleaned carbonization gas exiting from said cleaning means; a fluidized bed or swirling layer gasifier which has supplied thereto an oxygen-containing gasifying agent, the pyrolytic coke, and, optionally, waste materials, and from which exit a hot gas, having a temperature of between 400° and 1000° to be used for combustion in said combustion means, and an inert ash; and a separate cleaning or purification stage for the hot gas from the fluidized bed or swirling layer gasifier.

2. The apparatus according to claim 1 further comprising gas conduits from the cleaning means and purification stage to carry the carbonization gas and hot gas respectively.

3. The apparatus according to claim 2, wherein the fluidized bed or swirling layer gasifier is adapted for use without employing a secondary medium.

4. The apparatus according to claim 1, wherein one or both cleaning or purification stages are solids-gas separators.

5. The apparatus according to claim 4 further comprisng gas conduits from the cleaning means and purification stage to carry the carbonization gas and hot gas respectively.

6. The apparatus according to claim 2, wherein one or both of the gas conduits carrying the carbonization gas or the hot gas, include heating means so as to maintain the temperature of the respective gas above 200° C.

7. The apparatus according to claim 2, wherein the gas conduits are joined together into a mixed gas conduit.

8. The apparatus according to claim 3, wherein the respective gas conduits for the carbonization gas or the hot gas are joined together into a mixed gas conduit.

9. The apparatus according to claim 5, wherein the respective gas conduits for the carbonization gas or the hot gas are joined together into a mixed gas conduit.

10. The apparatus according to claim 6, wherein the gas conduits for the carbonization gas or the hot gas, respectively, are joined together into a mixed gas conduit.

* * * * *